United States Patent
Ho et al.

(10) Patent No.: US 11,244,524 B2
(45) Date of Patent: Feb. 8, 2022

(54) SYSTEM AND METHOD FOR MANAGING ELECTRONIC LOCKS

(71) Applicant: IGLOOCOMPANY PTE. LTD., Singapore (SG)

(72) Inventors: Khee Kien Ho, Singapore (SG); Sastra Winarta, Singapore (SG); Chun Chiang Eric Chan, Singapore (SG)

(73) Assignee: IGLOOCOMPANY PTE. LTD., Singapore (SG)

( * ) Notice: Subject to any disclaimer, the term of this patent is extended or adjusted under 35 U.S.C. 154(b) by 0 days.

(21) Appl. No.: 17/251,489

(22) PCT Filed: Jun. 13, 2019

(86) PCT No.: PCT/SG2019/050297
§ 371 (c)(1),
(2) Date: Dec. 11, 2020

(87) PCT Pub. No.: WO2019/240669
PCT Pub. Date: Dec. 19, 2019

(65) Prior Publication Data
US 2021/0319639 A1     Oct. 14, 2021

(30) Foreign Application Priority Data
Jun. 13, 2018     (SG) .............................. 10201805051P (51) Int. Cl.
*G07C 9/00*     (2020.01)
*G07C 9/22*     (2020.01)

(52) U.S. Cl.
CPC ........... *G07C 9/00571* (2013.01); *G07C 9/22* (2020.01); *G07C 2209/08* (2013.01)

(58) Field of Classification Search
CPC ....................................................... G07C 9/00
See application file for complete search history.

(56) References Cited

U.S. PATENT DOCUMENTS

10,964,141 B2 *   3/2021   Burris ................ G07C 9/00912
2009/0097720 A1   4/2009   Roy et al.
(Continued)

FOREIGN PATENT DOCUMENTS

WO     2015023737 A1     2/2015

OTHER PUBLICATIONS

International Search Report and Written Opinion of International Searching Authority for International Application No. PCT/SG2019/050297.

*Primary Examiner* — K. Wong
(74) *Attorney, Agent, or Firm* — JCIP; Joseph G. Chu; Jeremy I. Maynard (57) ABSTRACT

An access management system and a method for managing electronic locks are disclosed. The system comprises a user management module configured to provision access rights to an authorized user associated with the electronic lock, wherein a first factor authentication data is configured to be associated with the authorized user. The system comprises a server arranged in wireless communication with the access management system and each electronic lock associated with each of the plurality of entry points. The server is configured to perform a first factor authentication and a second factor authentication of the user for releasing the electronic lock for entry to the authorized user of the entry point.

20 Claims, 5 Drawing Sheets

(56) References Cited

U.S. PATENT DOCUMENTS

2013/0347129 A1  12/2013  Samuelsson et al.
2014/0239647 A1   8/2014  Jadallah et al.
2015/0347734 A1  12/2015  Beigi

* cited by examiner

SYSTEM AND METHOD FOR MANAGING ELECTRONIC LOCKS

TECHNICAL FIELD

The present disclosure generally relates to electronic locks. More particularly, the present disclosure relates to access management systems and methods and electronic locking devices with multi-factor authentication.

BACKGROUND

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Currently, there is a growing trend in the use of smart locks in the home to restrict access to authorized individuals. Some smart locks typically require a user to use an application on the mobile device to unlock the smart lock for the home. Such smart locks usually rely on single factor authentication methods, either via a personal identification number (PIN), a card or use of biometric data access.

However, in the enterprise setting, for example, real estate management companies that manage multiple residential or commercial units or multiple entry points, these residential or commercial units are prone to security breaches as physical keys to these units may be misplaced or easily duplicated and fall into the hands of unauthorised users. Short term occupants of these units may have to coordinate key exchanges with building and property managers who may not be available around the clock. If residential or commercial units utilise smart locks for their residential or commercial unit to manage access, smart locks that rely on single factor authentication methods are also prone to security breaches as tokens and PINs may be easily shared with unauthorized users.

Additionally, real estate managers typically manage multiple residential and commercial units at a time, and they frequently issue keys or passcodes to third parties with various roles who require access to the residential or commercial units for varying lengths of time. For example, a handyman or technician may only be given access rights for a single visit while a cleaner may have a longer term access rights. Real estate managers may find it difficult to manage the duration of access rights given to various people and lapses in administration can lead to security breaches.

Within the fleet management industry, operators manage commercial vehicles such as cars, vans, trucks, specialist vehicles, trailers, ships and rail cars in trains. Some of these commercial vehicles may carry high-value cargo which are prone to being stolen or hijacked during transportation to its intended destination. Typicality, these high-value cargo may be secured by locks or electronic locks. However, with the increased sophistication of organized crime, these electronic locks may not provide enough security to prevent the high-value cargo from being stolen.

Infrastructure management, particularly the security of high security critical installations such as power generation plants, cell towers, water supply installations, data centers, buildings housing essential services, requires increased security measures in the light of threat of terrorist attacks and cyberterrorism. These critical installations may be in remote areas that are secured by locks or electronic locks which may be prone to being hacked, or lapses in procedures amongst employees or security personnel may cause issued keys or passcodes to fall into unauthorised users, leading to security breaches.

The present invention attempts to address or to overcome at least some of the aforementioned problems. Accordingly, it would be desirable to provide an efficient method and system for controlling access to multiple entry points secured by electronic locks. Accordingly, it would be desirable to improve the security, efficiency and flexibility of building and residential management operators managing multiple entry points secured by electronic locks. Accordingly, it would be desirable to provide reassurance and increased security to individual owners of highly secured areas, residential or commercial units that their properties can only be accessed by authorized users.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the invention, there is disclosed an access management system for controlling access to a plurality of entry points each secured by an electronic lock, comprising a user management module configured to provision access rights to an authorized user associated with the electronic lock, wherein a first factor authentication data is configured to be associated with the authorized user; at least one server arranged in wireless communication with the access management system and each electronic lock associated with the each of the plurality of entry points; wherein the at least one server is configured to: receive, by the server, an input first factor authentication data from the authorized user; determine if the input first factor authentication data corresponds with the first factor authentication data associated with the authorized user of the electronic lock; generate, by the server, a second factor authentication data configured for transmission to a user device of the authorized user, in response to the input first factor authentication data matching the first factor authentication data associated with the authorized user; receive, by the server, an input second factor authentication data from the authorized user; perform a second factor authentication of the user, wherein the second factor authentication includes determining that the input second factor authentication data corresponds with the second factor authentication data; release, by the electronic lock, a locking mechanism into an open position for granting entry to the authorized user of the entry point, in response to the input second factor authentication data matching the second factor authentication data generated by the server.

Preferably, a grant access module is configured to assign an authorized time period to the authorized user, wherein the authorized time period defines a first time period when the authorized user is authorized to unlock the electronic lock and a second time period when the authorized user is not authorized to unlock the electronic lock.

Preferably, a role management module is configured to assign a predetermined role to the authorized user, wherein the predetermined role is associated with a predetermined authorized time period when the authorized user is authorized to unlock the electronic lock.

Preferably, a lock management module is configured to create a predetermined virtual perimeter around an intended destination, wherein the electronic lock is activated to receive a first factor authentication data when the electronic lock is within the predetermined virtual perimeter around the intended destination, and deactivated to receive the first factor authentication data when the electronic lock is outside the predetermined virtual perimeter around the intended destination.

Preferably, the first factor authentication data includes any one of the following: a unique passcode, a biometric signature or a secret key.

Preferably, the input first factor authentication data is received by a gateway device in wireless communication with the electronic lock, wherein the gateway device is configured for transmitting the input first factor authentication data to the application server.

Preferably, the one or more electronic lock each includes a memory and a wireless transceiver in data communication with the memory, wherein the memory is configured to synchronize the plurality of first factor authentication data with the application server at a predetermined time interval.

In accordance with another aspect of the invention, there is provided a method for controlling access to a plurality of entry points each secured by an electronic lock controlled by a lock controller having a memory, the method comprising the steps of: storing a plurality of first factor authentication data, wherein each of the plurality of first factor authentication data is associated with an authorized user of one or more of the electronic locks; receiving, by an application server configured for wireless communication with the electronic lock and a user device of the authorized user, an input first factor authentication data from the authorized user; determining if the input first factor authentication data corresponds with the first factor authentication data associated with the authorized user of one or more of the electronic locks; generating, by the application server, a second factor authentication data configured for transmission to the user device of the authorized user, in response to the input first factor authentication data matching the first factor authentication data associated with the authorized user of the one or more electronic locks; receiving, by the application server, an input second factor authentication data from the authorized user; performing a second factor authentication of the authorized user, wherein the second factor authentication includes determining that the input second factor authentication data corresponds with the second factor authentication data; releasing, by the electronic lock, a locking mechanism into an open position for granting entry to the authorized user, in response to the input second factor authentication data entered by the authorized user matching the second factor authentication data.

Preferably, the first factor authentication data includes any one of the following: a unique passcode, a biometric signature or a secret key.

Preferably, the biometric signature includes any one of the following: a fingerprint information or a facial profile information.

Preferably, the plurality of first factor authentication data are stored in a lock user database of the application server.

Preferably, the input first factor authentication data is received by a gateway device in wireless communication with the electronic lock, wherein the gateway device is configured for transmitting the input first factor authentication data to an application server.

Preferably, the input first factor authentication data is received by an application server configured for wireless communication with the electronic lock, wherein the wireless communication further includes any one of the following: Sigfox, Lora, or Narrow-Band IoT technologies.

Preferably, the electronic lock further includes a wireless transceiver in data communication with the memory, wherein the memory is configured to synchronize the plurality of first factor authentication data stored on the application server at a predetermined time interval.

Preferably, the input first factor authentication data is received by the user device of the authorized user and transmitted wirelessly to the electronic lock through short-range wireless communication technology.

Preferably, the user device includes any one of the following: a mobile device, an electronic token or a software token.

Preferably, the input second factor authentication data includes any one of the following: a one-time passcode, a time-based one-time passcode, a biometric signature or a secret key.

Preferably, the input second factor authentication data is received by the user device of the authorized user and transmitted wirelessly to the electronic lock through short-range wireless communication technology.

Preferably, the input second factor authentication data is configured for transmission to the user device via any one of the following communication channels: Short-Messaging System, Email, or Whatsapp.

Preferably, the method further comprises the steps of: logging an event in the lock controller, wherein the event corresponds to a date and time stamp of an instance when the input first factor authentication data does not match the first factor authentication data associated with the authorized user of the one or more electronic locks; and sending an alarm notification to the authorized user of the one or more electronic locks.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

In order that the invention may be readily understood and put into practical effect, particular embodiments will now be described by way of examples and not limitations, and with reference to the figures. It will be understood that any property described herein for a specific system may also hold for any system described herein. It will be understood that any property described herein for a specific method may also hold for any method described herein. Furthermore, it will be understood that for any system or method described herein, not necessarily all the components or steps described must be enclosed in the system or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

To achieve the stated features, advantages and objects, the present disclosure provides solutions that make use of computer hardware and software to improve the security and efficiency of authentication of an electronic lock. The present disclosure provides for an access management system for controlling multiple entry points each secured by an electronic lock with an associated number of authorized users. The present disclosure can be applied to electronic locks with multi-factor authentication capabilities. These electronic locks include electronic locks with no capability of connection to a network or to the access management system or to electronic locks that are configured for access to a network or to the access management system.

Electronic locks for use with the access management system may rely on a single factor or multi-factor authentication methods for unlocking the electronic locks. Where increased security is desired, multi-factor authentication is used. A multi-factor authentication is based on two or more authentication factors, and these factors are based on what the user knows and who the user is. For example, authentication factors that are based on what the user knows may include a pre-configured password issued by the owner or administrator, or a server-generated password or a one-time password. Authentication factors that are based on who the user is include biometric information which may include facial recognition, fingerprint information, retinal information or voice recognition.

In some embodiments, electronic locks with multi-factor authentication methods are used. The electronic lock could be a lock system where the user is required to register at least a first factor authentication data and a second factor authentication data locally on the electronic lock. The first factor and second factor authentication data may be stored on the memory of the electronic lock. For example, the electronic lock includes an input device. The input device may include a keypad, an access card reader and/or a biometric sensor (e.g. Fingerprint information or facial information). An access right owner or administrator may register the first authentication data (for example, a password) and the second authentication data (for example, his fingerprint) for storage on the memory of the electronic lock. On requesting for access, he enters the first authentication data, followed by the second authentication data via his fingerprint information on the biometric sensor before the electronic lock opens and allows access. The lock may take many physical form factors including padlocks, deadbolts, mortises, rim locks, latches or even electro-magnetic door locks.

In another embodiment, the electronic lock may be configured to receive a secret key from a user device that is in wireless communication with the electronic lock. For example, the electronic lock may include a wireless transceiver and processor that are configured to wirelessly receive a secret key from the user device without requiring any manual input in the electronic lock. The secret key, which involves the use of secret key cryptography using symmetric-key algorithms, are algorithms for cryptography that uses the same cryptographic keys for both encryption of plaintext and decryption of ciphertext and are well-known in the art. For example, secret key cryptographic algorithms such as DES, 3-DES, IDEA, Blowfish and Advanced Encryption Standard (AES) may be used. The keys may be identical or there may be a simple transformation to go between the two keys. The user device may be a computer, laptop, handheld computer, mobile communication device, smartphone, tablet, IoT device, a hardware token, a software token, or any other device capable of sending and/or receiving over the network. For example, the wireless transceiver of the electronic lock is capable of receiving data via short-range wireless communication protocols such as Bluetooth or Bluetooth Low Energy. In some embodiments, the user may present a user device containing a secret key in close proximity to the electronic lock, which causes the secret key to be transmitted wirelessly to the electronic lock, and once the electronic lock validates the first factor authentication, the user thereafter presents a second factor authentication data. The second factor authentication data may include a unique passcode, an access card or biometric data. The electronic lock may remain connected to the user device via Bluetooth and send events to the access management system via the internet using the user device as a conduit, as well as all other events whilst it is connected to the user device.

In various embodiments, and for the purposes of managing access for multiple locks each secured by an electronic lock in one or more locations, electronic locks with multi-factor authentication methods are used. A remote access management system may be utilized to manage the multiple locks. An administrator of the access management system may provision access right owners who in turn may provision access right grantees specific roles and permission levels to associated electronic locks. Each access right owner and access right grantee may choose a first factor authentication data for unlocking the electronic lock and each will be requested for a unique first factor authentication data which is saved in a lock user database, details of which will be explained hereinafter. The first factor authentication data may include a unique passcode or a biometric signature. A biometric signature is a unique physical characteristic of a user and can include facial profile information, fingerprint information, voice recognition or retinal information of a user.

Figure 1:
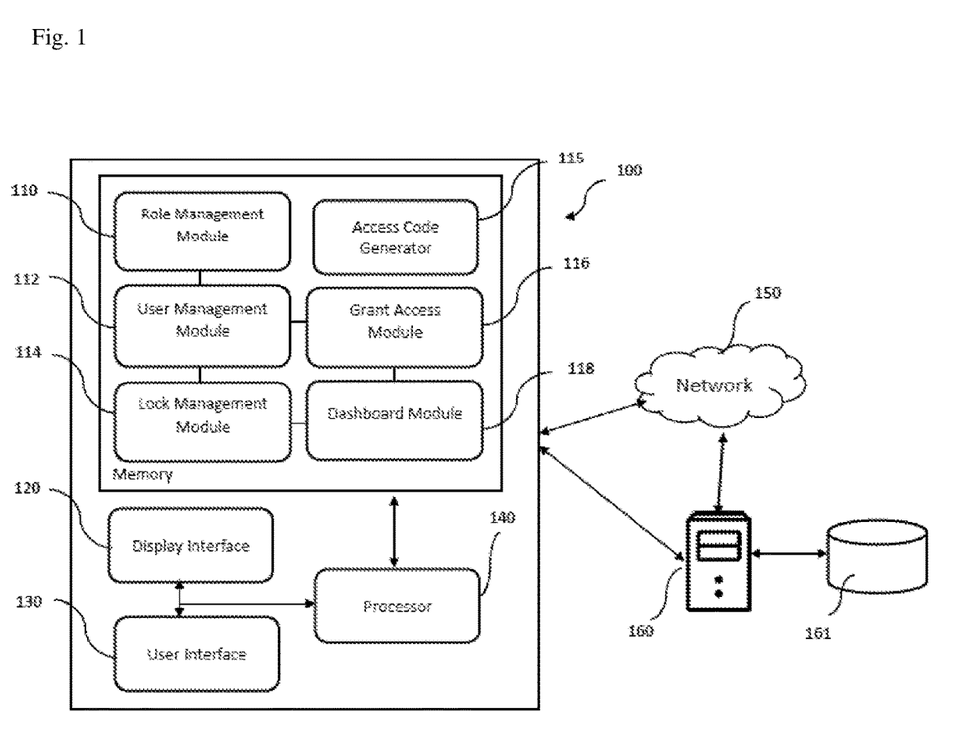
FIG. 1 shows a block diagram of an access management system according to various embodiments.

FIG. 1 illustrates an access management system according to various embodiments. The access management system 100 may be used in real estate management operators such as commercial buildings, hotels, co-living spaces, serviced apartments or suites, short-term accommodation units, groups of apartment units managed by a single operator, fleet management for management of vehicles transporting high-value cargo or for management of vehicles, and infrastructure management of critical key installations for essential services or critical data. The access management system 100 may be integrated with existing hotel or accommodation reservation systems, fleet management systems or infrastructure management systems. Other means of automated import or manual entry of authorized users may be provisioned to facilitate integration with the access management system. The access management system 100 offers management operators an efficient and secure way of managing multiple entry points that are each secured by an electronic lock. The access management system 100 controls and manages the authorized users who may have access to one or more of these entry points with a specific duration of access.

The access management system 100 may include several modules including a user management module 112, a role management module 110, a lock management module 114, a grant access module 116 and a dashboard module 118. The system 100 may include an application server 160 in communication with a computing device (not shown) over a network 150. Although the singular is used to describe the application server, an application server 160 as described herein may operate as a single computing device, a set of computing devices, or a distributed computing cluster. Similarly, a computing device may be one or more programming devices capable of running a web application or native application to communicate with the application server. The application server 160 and/or computing device may have one or more processors configured to execute instructions retained in the database or memory. In some embodiments, application server and/or computing device may include servers, computers, laptops, notebooks, portable handheld computers, mobile communication devices, smart phones, personal digital assistants, tablets, wearable devices, Internet of Things (IoT) devices, or any other communication devices capable of sending and receiving data over the network 150.

As used herein, the term 'network' refers to a Local Area Network (LAN), a Metropolitan Area Network (MAN), a Wide Area Network (WAN), a Low Power Wide Area Network (LPWAN), a cellular network, a proprietary network, and/or Internet Protocol (IP) network such as the Internet, an Intranet or an extranet. Each device, module or component within the system may be connected over a network or may be directly connected. A person skilled in the art will recognize that the terms 'network', 'computer network' and 'online' may be used interchangeably and do not imply a particular network embodiment. In general, any type of network may be used to implement the online or computer networked embodiment of the present invention. The network may be maintained by a server or a combination of servers or the network may be serverless. Additionally, any type of protocol (for example, HTTP, FTP, ICMP, UDP, WAP, SIP, H.323, NDMP, TCP/IP) may be used to communicate across the network. The devices as described herein may communicate via one or more such communication networks. The communication over the network may utilize data encryption. Encryption may be performed by way of any of the techniques available now available in the art or which may become available.

The access management system 100 include various modules that are accessible by administrators and authorized users via a mobile application or web application for configuration, provisioning and deprovisioning of multiple authorized users for multiple entry points each secured by an electronic lock. A mobile or a web application can be a mobile or a web application that runs and be executed on, for example, a user device or a mobile communication device or a computing device.

In some embodiments, the mobile application can be accessed via the user device of the administrator, access right owner or access right grantees with the appropriate permission levels. The mobile application allows the user device to control the electronic lock via short range wireless communication protocols such as Bluetooth or Bluetooth Low Energy by pairing the user device with the electronic lock. When this is done, the user can edit or delete passcodes, create customised unique passcodes, or synchronize the data within the user device to the electronic lock.

The access management system 100 comprises an access code generator 115 that is responsible for generating second factor authentication data according to the granted access rights. The second factor authentication codes may include one-time passcodes, time-based one-time passcodes, cryptographic keys, electronic keys or the like. Upon authenticating a first factor authentication data received from a user device or electronic lock, either or both in wireless communication with the access management system, the access code generator 115 generates a second factor authentication code and stores them in a lock user database 161 together with the relevant data about the associated user devices, electronic locks, locations, access right owners, access right grantees, etc. The lock user database 161 may be maintained on the application server 160 or on a separate server available for communication over a private network. The access code generator 115 also handles other administrative tasks such as automatic expiration of second factor authentication codes, initiation of second factor authentication codes for transmission to associated user devices or associated electronic locks. The transmission of second factor authentication codes to associated user devices and/or associated electronic locks can be executed by implementing one or more layers of a layered communications protocol used for the transmission. Although the access code generator 115 is shown as part of the access management system 100, the access code generator 115 may be on a separate application server 160 or server.

The access management system 100 provides an efficient way for an administrator to manage the access rights of an access right owner and access rights grantees. The access management system 100 includes a user management module 112 which assigns access rights to authorized users of an associated electronic lock. Each electronic lock for an entry point may be identified by a lock ID or serial number. Initially, the access right owner defines the list of access right grantees or authorized users or tenants of the residential or commercial units. In some embodiments, the access right owner or administrator may authorize a user by sending an invite to the user via an email address. The user will then receive an email address with a link to confirm registration as an access right grantee. The access right owner is typically the registered and/or authorized owner of the residential or commercial unit or the service provider who may have been granted the access rights by the registered and/or authorized owner of the residential or commercial unit. The access right owner may also access the various modules of the access management system to configure, provision and deprovision access rights to access right grantees with temporary access rights.

The administrator proceeds to provision the access right owner who in turn provisions other access right grantees access to the associated electronic lock related to the unit. In some embodiments, the access right owner authorizes the administrator to provision the access rights to the access right grantees. When the access right owner or the access right grantee is provisioned for right of entry and exit via the associated electronic lock identified by an associated lock ID, the administrator will capture the personal details of the access right owner and the access right grantees, which may include names, addresses, contact numbers, user device numbers, user device serial number or identification numbers, and/or biometric signatures that can be used for authentication of the first factor authentication or second factor authentication. The access right owner and grantee may be requested for a type of first factor authentication data to be registered into the user management module. For example, the first factor authentication data requested may be in the form of a unique passcode, a hardware token, a software token, or a biometric signature, or the access right grantee may be given a choice of the first factor authentication data to choose from. The access right owner and grantee will key in their personal details into the user management module via manual input or the personal details may be obtained by import through communication with other third party systems or other forms of automated import. The first factor authentication data and personal details of the access right owners and access right grantees are stored in the lock user database 161 that assigns them to the associated electronic locks with their associated lock IDs and locations.

In use, for example, if a server generated one-time password is used as a second factor authentication passcode, the user management module will retrieve the personal details of the related access right owner and grantee from the lock user database 161 and send the server generated one-time password to the related access right owner and grantee via the registered mobile phone number or registered email address. In another example, if biometric signatures such as facial recognition is used as a second factor authentication passcode, the user management module would then register the different face profiles of the access right owner or grantee from a facial recognition engine to learn the user's face. In another embodiment, if a hardware or software token (like a time-based OTP-based Google Authenticator) is used, the user management module 112 can register the token and associate it to the access right owner and access right grantees.

The access management system 100 also includes a role management module 110 that creates and defines roles for different types of access rights grantees. The authorisation may comprise assigning and/or creating roles and customizing permission levels for the assigned or created roles with different access rights to the electronic lock or to a group of electronic locks. Roles may be pre-configured or certain roles could be created by the administrator with different permission levels for the different modules in the access management system. In some embodiments, the administrator or the access right owner can assign roles to access right grantees who may only have temporary access to the entry points for a predetermined duration of time or predetermined time slot on a regular interval. For example, the administrator may create a role called 'Security Team' for security personnel who protect a building, a container trailer or key vital installation. The administrator may configure the 'Security Team' to limited use of the access management system and to a group of locks within the building, trailers or vital installations. In other embodiments, roles may be assigned to a property management company who wishes to rent out an apartment to potential tenants, or to a cleaner who cleans an apartment at a regular scheduled day a week for a specific duration of time. In each of these cases, the administrator or access right owners can assign a role for each of these cases and to authorize each role with temporary access rights to the associated electronic lock(s) via a grant access module 116, details of which will be explained hereinafter.

A grant access module 116 is used to manage, provision and grant access to specific access right grantees with assigned roles (by the role management module 110) to a specific electronic lock or a to a group of electronic locks. The access granted may be one-time or over a specific duration or interval. Multiple users may be granted access to multiple locks. For example, the administrator or access right owner may grant an employee of a property management company temporary access rights to several apartment units to show to various potential tenants during the period of time for viewings by the potential tenants. The administrator or access right owner may also authorize a cleaner who cleans multiple units access rights to several units during the scheduled cleaning time.

A lock management module 114 is used to manage the electronic locks in the access management system 100. In some embodiments, the lock management module 114 provides an overview of the electronic locks under management, the remaining battery life of each electronic lock and the 'last synced' status. The 'last synced' status indicates the time the particular electronic lock was last synchronized with the application server 160. Additionally, the administrator or access right owner may configure how each electronic lock is to be accessed via first authentication data. For example, the electronic lock can be configured to be accessed by a unique passcode, a bluetooth key or secret key, or biometric signature. When an electronic lock is provisioned to access right owners and grantees, additional useful information including geolocation, grouping and informative tags may be captured. In an enterprise scenario, a company, such as a real estate management company, fleet management company, or an infrastructure management company, may be managing thousands of electronic locks within a location or several locations. Additional information may be used to facilitate information display and searching for the electronic locks. Only an access right owner or administrator or access right grantee with the right role and permissions will be able to access the information in the lock management module 114. In the lock management module 114, the administrator and access right owners will be able to see the activity log or audit trail of the locks including the events and alarms, for example when the lock has been accessed or opened in the different stages of the multifactor authentication, whether the wrong attempts have been made, whether the lock has been tampered with or if the lock has been moved out of position (for a padlock with GPS for example), or a low battery alert. In addition, other information tied to the modes of authentication may be captured by the electronic locks and retrieved in the lock management module 114. For example, if facial recognition is used as an authentication factor, images of the person attempting access may be retrievable from the activity logs. The activity logs or audit trails of the user interaction will be explained in detail hereinafter.

The administrator, access right owners and access right grantees can use a user interface 130 to access the access management system 100 to manage access to the plurality of entry points. The user interface may include a user interface of an application, such as a web or mobile application accessible via a mobile device or a computing device. The user interface includes a dashboard module 118 where the administrator, access right owners and access right grantees, have an overview of the multitude of locks that they are managing. Access right grantees, by virtue of their temporary access rights, may have limited visibility of the modules they can access or edit, due to their authorisation status. The dashboard module 118 may include all the critical alerts, for example of locks with low battery, as well as real time information of the different locks being accessed or failed authentication attempts. In an embodiment of the dashboard module 118, the information may be presented on a map view, where each lock is represented by a marker on the map, and the markers could be clustered. When an event or alarm happens, the administrator or access right owner of the dashboard (or access right grantees with correct permissions) will be able see the events pop up on the geolocation on the map. The user may drill down the cluster to see further information. An activity log of the alerts may exist as a panel and the user may click through the see detailed information of the lock. The total number of locks requiring attention under each alarm/alert category (unlock, failed authentication, tamper, low battery) may also be shown for the user to drill down immediately to see which are the locks that require attention. For an access right owner with access to a single entry point secured by an associated electronic lock, for example a home, a storage facility, an office, a car, the access right owner can manage access to his property through the dashboard module and various other modules mentioned above.

Figure 2:
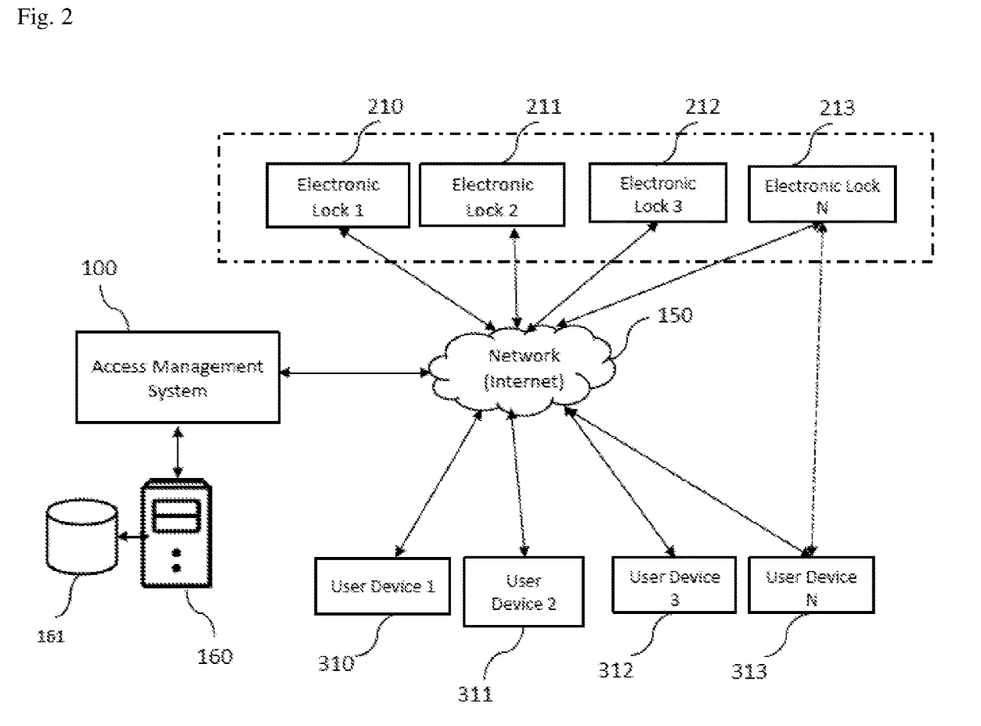
FIG. 2 shows a high-level overview of the access management system interacting with other components of the system according to various embodiments.

FIG. 2 is an illustration of the access management system 100 and its interaction with one or more electronic locks 210-213 and with one or more user devices 310-313 over a network 150 according to various embodiments. The application server 160 is arranged in data communication with the lock user database 161 which stores relevant data about the associated user devices 310-313, electronic locks 210-213 and their associated lock IDs, locations, access right owners, access right grantees, etc. The lock user database 161 may be maintained on the application server 160 or on a separate server available for communication over a private network. The access management system 100 may include an application server 160 in communication with a user device 310 or a group of user devices 310-313 over a network 150. The user device 310 may be a computer, laptop, handheld computer, mobile communication device, smartphone, tablet, IoT device, a hardware token, a software token, or any other device capable of sending and/or receiving over the network.

In some embodiments, the electronic locks 210-213 are in wireless communication with the application server 160 through a network. As mentioned above, the network 150 may represent the Internet, or may be a local area network (LAN), or a wide area network (WAN), or a Low Power Wide Area Network (LPWAN), or a proprietary network for a company. In some embodiments, the electronic locks include sensors or transceivers that are capable of using LP-WAN technologies such as Sigfox, Lora, or Narrow Band IoT (NB-lot) to connect to the network 150 with the advantage of lower cost, longer battery life and higher connection density. The electronic locks 210-213 are capable of sending events associated with the locking or unlocking of the electronic locks, or alarm events associated with tampering, forced entry or low battery, to the access management system 100 through the network 150.

Figure 3:
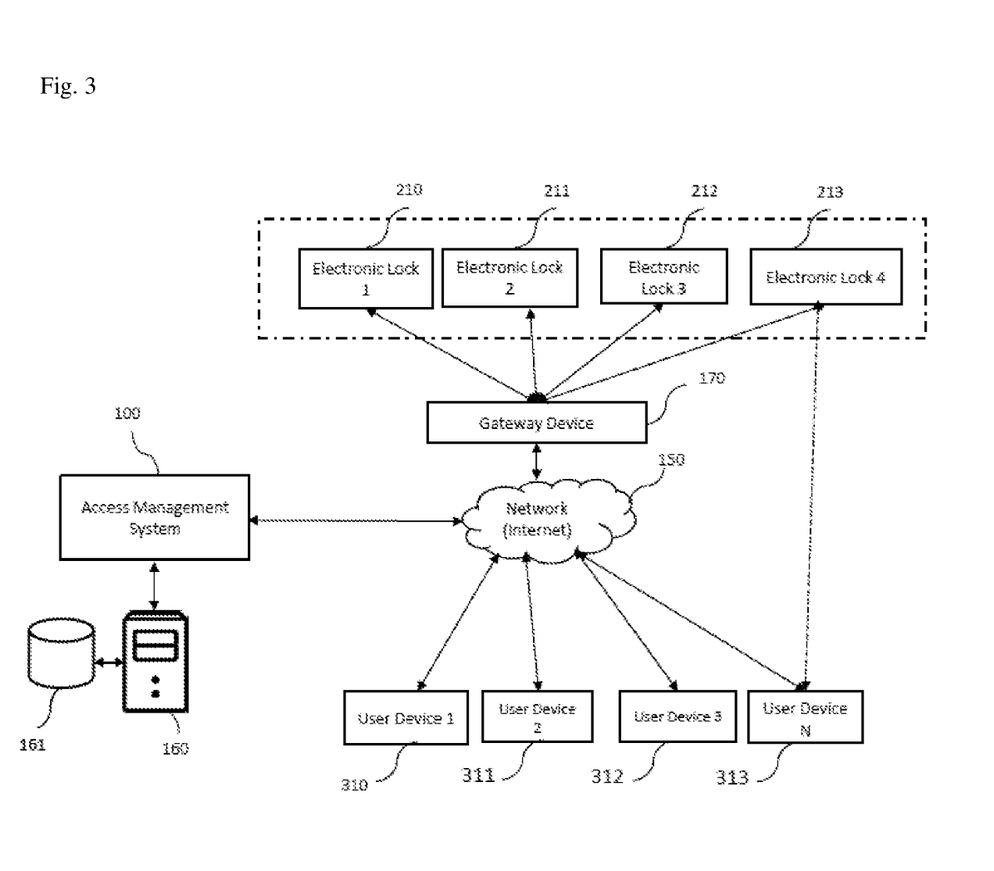
FIG. 3 shows a high-level overview of the access management system interacting with other components of the system according to various embodiments.

FIG. 3 is an illustration of the access management system 100 and its interaction with multiple electronic locks 210-213 arranged in wireless communication with a gateway or hub device 170 and multiple user devices 310-313 over a network 150 according to various embodiments. In some embodiments, the electronic locks 210-213 can be connected to the network 150 via one or more gateway devices 170. The gateway device 170 receives data from the group of electronic locks 210-213 and communicate with the application server 160 to upload individual or aggregated data from the electronic locks 210-213, to send and to receive first and second factor authentication data from and to the electronic locks, etc. The gateway device 170 may also communicate with other gateway devices to provide load balancing of sensor platforms, sensor platform handoff, data aggregation and filtering, and exchange of sensor platform encryption keys, and so forth. Each gateway device 170 may be participating in a cluster of electronic locks, and is typically beneficial that the overall system operates effectively. In some embodiments, the electronic locks 210-213 include sensors or transceivers that are capable of connecting to the network 150 via low power wireless transmission standards such as ZWave, Zigbee or Bluetooth low energy. The electronic locks 210-213 include sensors equipped with such low power wireless technology, and are connected to the network 150 via the gateway device 170. In some embodiments, the electronic locks 210-213 send alarm events to the access management system 100 such as successful or failed authentication unlock attempts and other alarm events as described above to the access management system 100.

Figure 4:
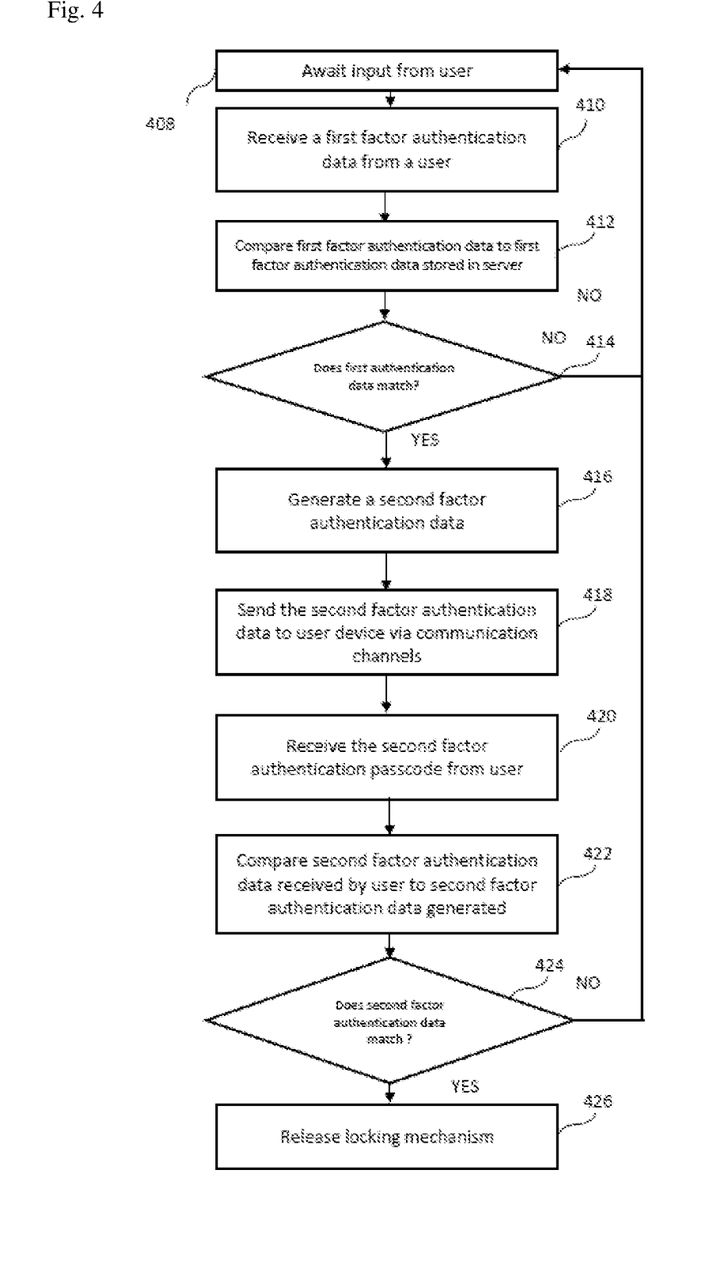
FIG. 4 illustrates a flow diagram of the process of unlocking an electronic according to various embodiments.

FIG. 4 illustrates a flow diagram of an example process for unlocking an electronic lock 210 capable of multi-factor authentication according to various embodiments. In various embodiments, the application server 160 receives the first factor authentication data from the user at the entry point secured by the electronic lock 210 at step 410. The electronic lock 210 may receive the first factor authentication data through various ways. In some embodiments, the user may submit the first factor authentication data through an input device on the electronic lock 210. The input device may be a touch screen or virtual keypad and may include a passcode interface for entering a passcode. The passcode interface may include a numeric keypad with * and # keys to signify the beginning and/or end of a passcode. Other keypad configurations include numbers, letters and/or symbols. The input device may also be an image capturing sensor or device such as a camera on the electronic lock configured for capturing retinal information or facial profile information of a user. The input device may also include a biometric data input device configured for capturing fingerprint information from the user. The input device may be a speaker that is capable of picking up sounds from the user.

In other embodiments, the user device 310, for example, a mobile device or a hardware token of the user, may be configured to transmit the first factor authentication data to the electronic lock 210 without requiring any manual entry on the electronic lock 210. For example, the application server 160 may enable the user device 310 to transmit the first factor authentication data using 802.11 wireless standards, Bluetooth Low Energy (BLE), near field communication (NFC), or other suitable short-range or long-range wireless communication protocols. The electronic lock 210 includes a wireless transceiver for communicating with the user device 310. In some embodiments, where the first factor authentication data includes a fingerprint information or facial profile, the user may use a biometric-enabled user device 310 that will capture his fingerprint information or facial profile via a mobile application using a fingerprint sensor or front camera of the mobile device or through a mobile application on the user device. The fingerprint information or facial profile information of the user is then transmitted wirelessly to the application server 160 through the electronic lock 210.

In other embodiments, the first factor authentication data may be authenticated through a user device 310 of the user. For example, the user may login to the access management system 100 so that the access management system 100 may validate the user device 310 based on the serial number or identification number of the user device 310 that is registered in the access management system. In other embodiments, this may be done through secret key cryptography (symmetric cryptography) using an identical shared secret key, as described above, or public-key cryptography (assymetric cryptography) methods that uses a public key and a private key. The public key which is used for encrypting is registered on the access management system 100 or the application server. The private key which is used for decrypting is stored in the user device of the registered user. In some embodiments, the public key and the private keys are issued during the setup and registration process. When a user provides a first factor authentication data through the mobile or web application of the access management system 100 on the registered user device 310, the user may provide a first factor authentication data through the mobile or web application on the user device 310. The first factor authentication data may be a fingerprint information or facial profile information. When the user provides the first factor authentication data on the user device 310, the private key stored on the user device is created and signed with the private key. In some embodiments, the private key is in the form of a token such as a JSON Web Token (JWT). The user device 310 then sends the signed private key to the access management system 100 or the application server 160 returns a valid token to the user device 310 upon validation.

Upon receipt of the first factor authentication data by the electronic lock 210, the electronic lock 210 which is arranged in wireless communication with the application server will transmit the first factor authentication data, or its equivalent in a hash format, to the application server 160. At step 412, the application server 160 will validate the first factor authentication data with the first factor authentication data associated with the user and permission levels stored in the lock user database 161. The application server 160 will also check the permission levels associated with the user, for example, available date and times, unavailable dates and times, or other limits. The limits may be based on the specific roles and permission levels registered by the administrator or the access right owner on the role management module 110, user management module 112, lock management module 114 and grant access module 116. If the first factor authentication data does not match the first factor authentication data registered by the user in the database at step 414, the application server 160 may return an error message in response to the failed authentication, failed permission level or other limits imposed by the various modules, and the user will be requested to input the first factor authentication data again at step 408. After a predetermined number of attempts, the application server may decline to provide a second factor authentication data, and the user will be denied entry In some embodiments, the first factor authentication data may be stored on a memory or database of the electronic lock 210, details of which will be explained hereinafter. Additionally, the access right owners and access right grantees associated with the electronic lock 210 together with their respective roles and permission levels may also be stored on the memory or database of the electronic lock. When the access right owner or access right grantees input the first factor authentication data at the electronic lock, the first factor authentication data could be checked against the database or memory of the electronic lock instead of against the application server 160. This provides the advantages of improving the speed of authentication at the entry point, reduces consumption of battery power and allows the electronic lock to work in an 'offline' mode without the presence of network connectivity. In some embodiments, the memory or database of the electronic lock 210 is synchronized with the application server 160 on a periodic basis. For example, the electronic lock 210 may be synchronized with the application server 160 at discrete time intervals, for example, once a week, once a month, once a year, or at any other desired time interval. The administrator and/or the access right owner can configure the synchronization on the lock management module 114 of the access management system 100. In some embodiments, the electronic locks may also be configured to receive software updates, firmware updates or other updates to the electronic lock 210 through synchronization with the application server 160 at regular or scheduled time intervals, which are also configurable by the administrator or access right owners.

Upon a successful validation of the first factor authentication data, at step 416, the access code generator 115 in data communication with the application server 160, may generate a second factor authentication data for transmission to the user device 310. At step 418, the mode of transmission of the second factor authentication data to the user device 310 may include Short-Messaging-System (SMS), Whatsapp, email, push notification or other suitable communication channels. The second factor authentication data may include a one-time password, a time-based one-time password, or a secret or public-private cryptographic key. The second factor authentication data may be generated based on suitable algorithms for passcode generation. For example, algorithms to generate passcodes may be based off time or other variables, or include division, subtraction, hash functions, lookup tables, quadratic functions, etc. The second factor authentication data may be numeric, alphanumeric, or may include special characters as desired.

In various embodiments that are similar to the first factor authentication data, at step 418, the electronic lock 210 will prompt the user to enter the second factor authentication data into an input device of the electronic lock 210. Users may submit the second factor authentication data at an input device of the electronic lock 210. The input device may include a touch screen or a virtual keypad for entering the second factor authentication data. The application server 160 may receive the second factor authentication data from the user at the entry point secured by the electronic lock 210 in other ways. In other embodiments, a secret key is generated by the application server 160, for example, AES-256. In this case, the user device 310 may be configured to transmit the second factor authentication data to the electronic lock without requiring any manual entry on the electronic lock. The transmission of the second factor authentication data may include short-range wireless communication protocols or other suitable modes of wireless communication protocols.

In other embodiments, public key cryptography using a public key and a private key as described above may also be used for validation of second factor authentication data. As mentioned above, the public key used for encrypting is registered on the access management system 100 or the application server. The private key used for decrypting is stored in the user device of the registered user. The public key and the private key may be issued during the setup and registration process. When a user provides a second factor authentication data through the mobile or web application of the access management system 100 on the registered user device 310, the user may provide a second factor authentication data through the mobile or web application on the user device 310. The second factor authentication data may be a fingerprint information or facial profile information. When the user provides the second factor authentication data on the user device, the private key stored on the user device is created and signed with the private key. In some embodiments, the private key is in the form of a token such as a JSON Web Token (JWT). The user device 310 then sends the signed private key to the access management system 100 or the application server for returns a valid token to the user device upon validation.

Upon receipt of the second factor authentication data by the electronic lock 210, the electronic lock, which is arranged in wireless communication with the application server, will transmit the second factor authentication data to the application server 160. At step 422, the application server 160 will validate the second factor authentication data with the second factor authentication data associated with the user and permission levels stored in the lock user database 161. The application server 160 will also check the permission levels associated with the user, for example, available date and times, unavailable dates and times, or other limits. The limits may be based on the specific roles and permission levels registered by the administrator or the access right owner on the role management module 110, user management module 112, lock management module 114 and grant access module 116. At step 424, if the second factor authentication data received by the user does not match the second factor authentication data generated by the server, the application server 160 may return an error message in response to the failed authentication, and the user will be requested to input the second factor authentication data again. Alternatively, after a predetermined number of attempts, the application server 160 may decline to perform the second factor authentication, and the user will be denied entry, or the user will have to perform the first factor authentication step again at step 408. If the second factor authentication data received from the user matches the second factor authentication data stored on the lock user database 161, the application server 160 will send a positive signal to the electronic lock which will cause the electronic lock to release its locking mechanism at step 426 to allow entry to the entry point.

While the above describes various types of first factor authentication methods and second factor authentication methods, it is envisaged that the electronic lock can use any one or more of the first factor authentication methods or any one or more of the second factor authentication methods, whether separately or as a combination to provide enhanced security for the users.

Figure 5:
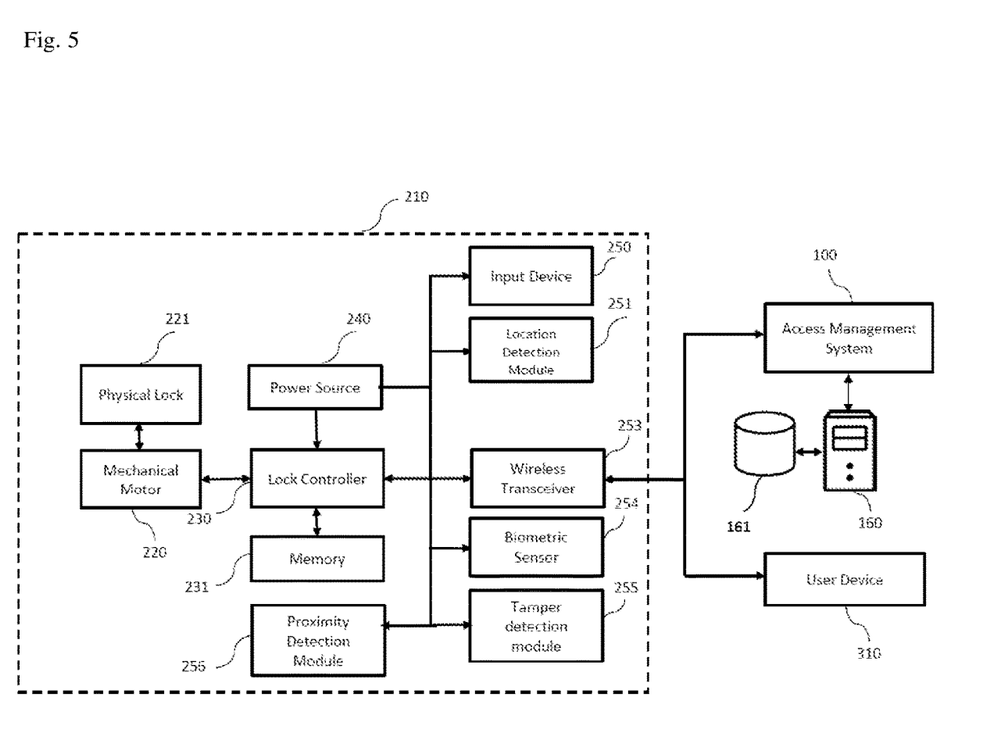
FIG. 5 illustrates a high-level block diagram showing the internal components of the electronic lock according to various embodiments.

FIG. 5 illustrates a high-level block diagram showing the internal components of the electronic lock 210 configured for wireless communication with the access management system 100 and user device 310, and the application server 160 according to various embodiments. The electronic lock 210 is installed on an entry point of an object, property or key installation. The entry point may include a door, such as a door of a building, a door in a residential or commercial unit, a door of a cabinet, a door of a safe, a door of a vehicle, door of a container, door of a key installation, etc. The electronic lock 210 comprises a lock controller 230 in data communication with a memory 231 and a wireless transceiver 253, a power source 240 and a mechanical motor 220 coupled to a physical lock 221. In some embodiments, the electronic lock 210 includes an input device 250 such as touch screen or virtual keypad for entering an input. In some embodiments, the electronic lock 210 includes a biometric sensor 254 for capturing biometric data such as a fingerprint sensor for capturing fingerprint information or an image capturing sensor for capturing facial profile information of users. In some embodiments, in the absence of a biometric sensor 254 on the electronic lock 210, the biometric data may be obtained from a user device 310 in wireless communication with the electronic lock 210.

The electronic lock 210 includes a wireless transceiver 254 for wireless communication with an access management system 100 or an application server 160 through a network 150. In some embodiments, the wireless transceiver 254 can communicate wirelessly with a user device 310 or through the access management system 100 via the network 150. In various embodiments, the wireless transceiver 254 can communicate via any of various technologies already mentioned above, such as a cellular network, a short-range wireless network, a wireless local area network (WLAN), a low-power Wide Area Network (LP-WAN), etc. The cellular network can be any of various types, such as code division multiple access (CDMA), time division multiple access (TDMA), global system for mobile communication (GSM), long term evolution (LTE), 3G, 4G, 5G, etc. The short-range wireless network can also be any of various types, such as Bluetooth, Bluetooth Low Energy (BLE), near field communication (NFC) etc.

The electronic lock 210 includes a lock controller 230. For example, the lock controller 230 maintains an activity log of all entries and exit of users and transfers the information to the application server 160 via wireless communication facilitated by the wireless transceiver 253 for storage in the lock user database 161. Whenever a user accesses an entry point via the electronic lock 210, the lock controller 230 logs the unlocking and locking of the electronic locks as events. These events are saved on the memory 231 of the electronic lock 210 and are sent via the network 150 to the access management system 100 and can be accessible by the access right owner or administrator. In some embodiments, unsuccessful attempts at entry or an unauthorized entry can be logged and transmitted to the access right owner or administrators for them to be notified via their user devices immediately.

In some embodiments, the electronic lock 210 includes a tamper detection module 255. The tamper detection module 255 includes sensors that detect when a physical lock is manually opened or closed by tracking the output signals of the mechanical motor as the bolt of the physical lock is manually actuated. In some embodiments, the sensors include a capacitive or optical sensor that can track the opening or closing of the physical lock. In some embodiments, the sensors include a magnetic field sensor on the mechanical motor that can track the opening or closing of the physical lock. In some embodiments, the sensors can detect when the input device such as a keypad front panel is forcibly removed. In some embodiments, the sensors include an accelerometer or motion sensors that detect abnormal shocks to the electronic lock. For example, the accelerometer or motion sensor can detect an acceleration that is more than a predetermined amount or above a maximum rate of acceleration observed during a period. This can indicate that a person may be trying to attempt a break in or forced entry of the door. In the aforesaid instances of unauthorized entry or tamper events, the lock controller 230 sends a tamper alarm event to the access management system and the administrator and access right owner can be notified through their user devices. If the sensor senses that the lock is open, the lock controller 230 sends a 'door not closed' alarm event to the access management system and the administrator and access right owner can be notified through their user devices.

In some embodiments, the electronic lock 210 includes a location detection module 251. The electronic lock 210 comprises a global positioning system (GPS) sensor that allows it to detect its location. The electronic lock 210 is designated a particular geolocation during the setup process and this is registered in the access management system and application server. In the event the electronic lock is removed from its designated location, the GPS sensor detects a different geolocation that falls out of range of its designated location, and the lock controller sends an 'out of location' alarm event to the access management system and application server. In other embodiments, the electronic lock 210 may be securing high-value cargo or equipment that is intended to be transported to an intended destination via commercial vehicles. In order to provide increased security and to ensure that the high-value cargo or equipment can only be accessed when it reaches its intended destination, the electronic lock can be configured to receive first factor authentication data or second factor authentication data only when its GPS sensor detects that it is within a virtual perimeter of the intended destination. This is known as geofencing, and the lock management module allows the administrator to configure the electronic lock to activate access to the electronic lock only when the GPS sensor detects that it has entered a predetermined virtual boundary around a geographical location.

The electronic lock 210 includes the standard structure of conventional door locks with moving parts to lock or to unlock the physical lock. The lock controller 230 controls a mechanical motor 220 which causes the mechanical motor 220 to open or close the physical lock 221. The mechanical motor 220 can have associated gears in order to generate the torque required to move the physical lock 221. The physical lock 221 may take many form factors including padlocks, deadbolts, mortises, rim locks, latches and electro-magnetic door locks.

The lock controller 230 includes a memory 231 capable of storing first factor authentication data and associated roles and permission levels of access right owners and access right grantees, biometric data, access details, logs of user interactions or associated timestamps and a record of the access right owner or administrator data. The memory 231 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magneto resistive Random Access Memory) or a PCRAM (Phase Change Random Access Memory).

As used herein, the term 'controller' broadly refers to and is not limited to single or multi-core general purpose processor, a special purpose processor, a conventional processor, a graphical processing unit, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit, a system on a chip (SOC), and/or a state machine.

The electronic lock 210 includes a power source 240 that provides power supply to the electronic lock 210. The power source can be a battery energy source, for example, a rechargeable battery.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An access management system for controlling access to a plurality of entry points each secured by an electronic lock, comprising a user management module configured to provision access rights to an authorized user associated with the electronic lock, wherein a first factor authentication data is configured to be associated with the authorized user;

at least one server arranged in wireless communication with the access management system and each electronic lock associated with the each of the plurality of entry points;

wherein the at least one server is configured to:

receive, by the server, an input first factor authentication data from the authorized user;

determine if the input first factor authentication data corresponds with the first factor authentication data associated with the authorized user of the electronic lock;

generate, by the server, a second factor authentication data configured for transmission to a user device of the authorized user, in response to the input first factor authentication data matching the first factor authentication data associated with the authorized user;

receive, by the server, an input second factor authentication data from the authorized user;

perform a second factor authentication of the user, wherein the second factor authentication includes determining that the input second factor authentication data corresponds with the second factor authentication data;

release, by the electronic lock, a locking mechanism into an open position for granting entry to the authorized user of the entry point, in response to the input second factor authentication data matching the second factor authentication data generated by the server.

2. The access management system according to claim 1, further comprising a grant access module configured to assign an authorized time period to the authorized user, wherein the authorized time period defines a first time period when the authorized user is authorized to unlock the electronic lock and a second time period when the authorized user is not authorized to unlock the electronic lock.

3. The access management system according to claim 1, further comprising a role management module configured to assign a predetermined role to the authorized user, wherein the predetermined role is associated with a predetermined authorized time period when the authorized user is authorized to unlock the electronic lock.

4. The access management system according to claim 1, further comprising a lock management module configured to create a predetermined virtual perimeter around an intended destination, wherein the electronic lock is activated to receive a first factor authentication data when the electronic lock is within the predetermined virtual perimeter around the intended destination, and deactivated to receive the first factor authentication data when the electronic lock is outside the predetermined virtual perimeter around the intended destination.

5. The access management system according to claim 1, wherein the first factor authentication data includes any one of the following: a unique passcode, a biometric signature or a secret key.

6. The access management system according to claim 1, wherein the input first factor authentication data is received by a gateway device in wireless communication with the electronic lock, wherein the gateway device is configured for transmitting the input first factor authentication data to the application server.

7. The access management system according to claim 1, wherein the one or more electronic lock each includes a memory and a wireless transceiver in data communication with the memory, wherein the memory is configured to synchronize the plurality of first factor authentication data with the application server at a predetermined time interval.

8. A method for controlling access to a plurality of entry points each secured by an electronic lock controlled by a lock controller having a memory, the method comprising the steps of:

storing a plurality of first factor authentication data, wherein each of the plurality of first factor authentication data is configured to be associated with an authorized user of one or more of the electronic locks;

receiving, by an application server configured for wireless communication with the electronic lock and a user device of the authorized user, an input first factor authentication data from the authorized user;

determining if the input first factor authentication data corresponds with the first factor authentication data associated with the authorized user of one or more of the electronic locks;

generating, by the application server, a second factor authentication data configured for transmission to the user device of the authorized user, in response to the input first factor authentication data matching the first factor authentication data associated with the authorized user of the one or more electronic locks;

receiving, by the application server, an input second factor authentication data from the authorized user;

performing a second factor authentication of the authorized user, wherein the second factor authentication includes determining that the input second factor authentication data corresponds with the second factor authentication data;

releasing, by the electronic lock, a locking mechanism into an open position for granting entry to the authorized user, in response to the input second factor authentication data entered by the authorized user matching the second factor authentication data.

9. The method according to claim 8, wherein the first factor authentication data includes any one of the following: a unique passcode, a biometric signature or a secret key.

10. The method according to claim 9, wherein the biometric signature includes any one of the following: a fingerprint information or a facial profile information.

11. The method according to claim 8, wherein the plurality of first factor authentication data are stored in a lock user database of the application server.

12. The method according to claim 8, wherein the input first factor authentication data is received by a gateway device in wireless communication with the electronic lock, wherein the gateway device is configured for transmitting the input first factor authentication data to an application server.

13. The method according to claim 8, wherein the input first factor authentication data is received by an application server configured for wireless communication with the electronic lock, wherein the wireless communication further includes any one of the following: Sigfox, Lora, or NarrowBand IoT technologies.

14. The method according to claim 8, wherein the electronic lock further includes a wireless transceiver in data communication with the memory, wherein the memory is configured to synchronize the plurality of first factor authentication data stored on the application server at a predetermined time interval.

15. The method according to claim 8, wherein the input first factor authentication data is received by the user device of the authorized user and transmitted wirelessly to the electronic lock through short-range wireless communication technology.

16. The method according to claim 8, wherein the user device includes any one of the following: a mobile device, an electronic token or a software token.

17. The method according to claim 8, wherein the input second factor authentication data includes any one of the following: a one-time passcode, a time-based one-time passcode, a biometric signature or a secret key.

18. The method according to claim 8, wherein the input second factor authentication data is received by the user device of the authorized user and transmitted wirelessly to the electronic lock through short-range wireless communication technology.

19. The method according to claim 8, wherein the input second factor authentication data is configured for transmission to the user device via any one of the following communication channels: Short-Messaging System, Email, or Whatsapp.

20. The method according to claim 8, further comprising the steps of:
- logging an event in the lock controller, wherein the event corresponds to a date and time stamp of an instance when the input first factor authentication data does not match the first factor authentication data associated with the authorized user of the one or more electronic locks; and
- sending an alarm notification to the authorized user of the one or more electronic locks.

* * * * *